Sept. 18, 1962 C. A. HENNESSY 3,054,576

CARRIER FOR PNEUMATIC TUBE SYSTEMS

Filed Feb. 17, 1960 4 Sheets-Sheet 1

INVENTOR.
Carroll A. Hennessy

BY
D. Emmett Thompson
ATTORNEY

Sept. 18, 1962 C. A. HENNESSY 3,054,576

CARRIER FOR PNEUMATIC TUBE SYSTEMS

Filed Feb. 17, 1960 4 Sheets-Sheet 2

INVENTOR.
Carroll A. Hennessy
BY D. Emmett Thompson
ATTORNEY

Sept. 18, 1962 C. A. HENNESSY 3,054,576

CARRIER FOR PNEUMATIC TUBE SYSTEMS

Filed Feb. 17, 1960 4 Sheets-Sheet 3

INVENTOR.
Carroll A. Hennessy

BY D. Emmett Thompson

ATTORNEY

Sept. 18, 1962 C. A. HENNESSY 3,054,576

CARRIER FOR PNEUMATIC TUBE SYSTEMS

Filed Feb. 17, 1960 4 Sheets-Sheet 4

INVENTOR.
*Carroll A. Hennessy*

BY *D. Emmett Thompson*

ATTORNEY 3,054,576

CARRIER FOR PNEUMATIC TUBE SYSTEMS

Carroll A. Hennessy, Syracuse, N.Y., assignor to Lamson Corporation, Syracuse, N.Y., a corporation of New York Filed Feb. 17, 1960, Ser. No. 9,387
9 Claims. (Cl. 243—39)

This invention relates to carriers for pneumatic tube systems. Often these systems comprise sizeable and extensive installations divided up into a plurality of lines, or routes, over which the carriers travel and there are a plurality of stations in each line to and from which the carriers may be sent. The tubes, through which the carriers travel, are provided with brushes which are engaged by contacts carried by the carriers to complete switches to switching devices located in the tube system. Certain of the contacts on the carriers are interconnected in such manner that, as the carrier travels through the tube system, certain circuits will be energized to actuate the switching devices so that the carrier will be directed over the desired line, or route, and discharged at the desired station.

This invention has to do more particularly with that type of carrier having a plurality of contacts which may be selectively interconnected to effect a desired routing and station selection. This type of carrier has heretofore been relatively expensive to construct. For various reasons the contacts on the carriers become damaged, or defective, and it is expensive to replace or repair the contacts and, in some designs, it is more economical to scrap the entire carrier and replace it with a new one.

This invention has as an object a carrier of the type referred to for pneumatic tube systems embodying a structural arrangement which is economical to manufacture and wherein the contacts may be quickly and conveniently replaced at a nominal cost.

The invention consists in the novel features and in the combinations and constructions hereinafter set forth and claimed.

In describing this invention, reference is had to the accompanying drawings in which like characters designate corresponding parts in all the views.

In the drawings—

Figure 2:
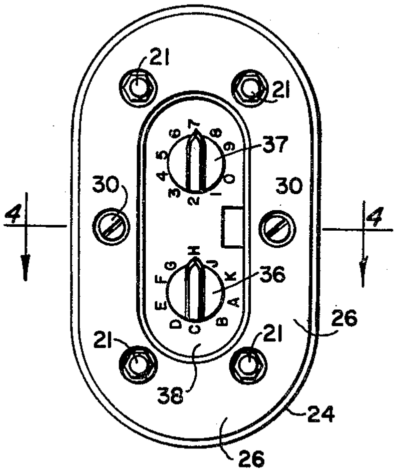
FIGURE 2 is an end elevational view, as indicated by the line 2—2, FIGURE 1.

The carrier consists of a tubular casing 10 which may be economically formed by being moulded from plastic material. The casing may be cylindrical in cross section or, as shown in FIGURE 2, obround in cross section. The casing is formed, or provided at one end, with a fixed closure 11, and at the opposite end there is a closure 12 attached to a hinge member 13. The closure is held in closed position by an elastic strap 14 attached to the side wall of the casing, the free end of the strap being connected to a pin 15 carried by the closure.

Figure 1:
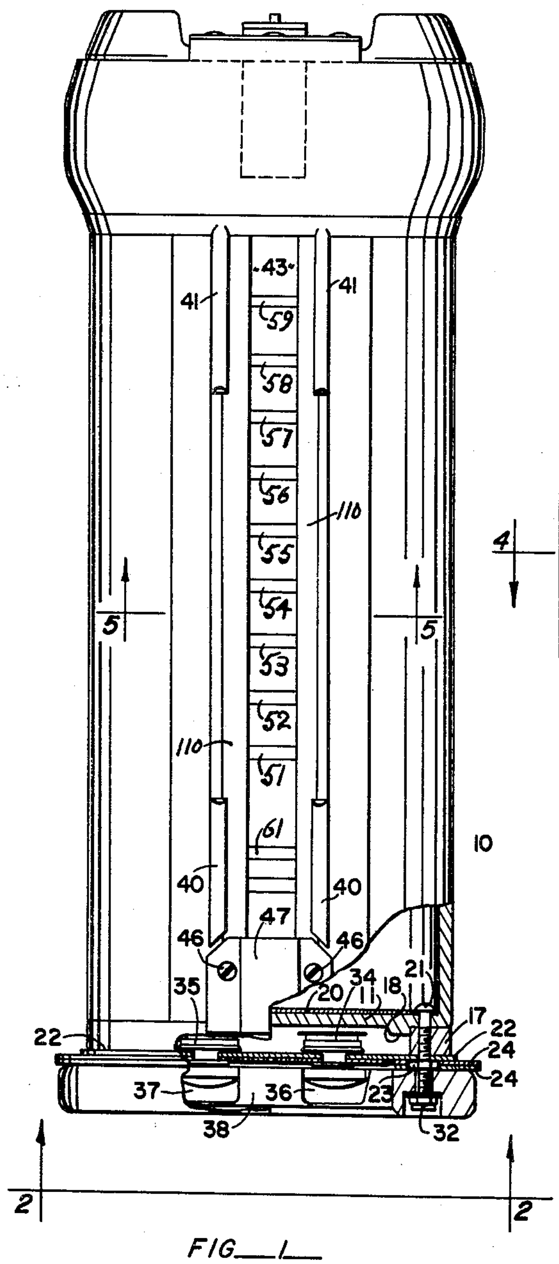
FIGURE 1 is a side elevational view with parts broken away and parts shown in section.

A spacing ring 17 is positioned on the closure 11 and is located by bosses 18 formed thereon. A reinforcing plate 20 is positioned on the inner surface of the end closure 11. A rigid switch mounting plate 22 is positioned on the spacer 17. The plate 20, end closure 11, spacer 17, and plate 22, are formed with four apertures through which bolts 21 extend, the assembly being secured together by nuts 23 threaded on the bolts 21, see FIGURE 1.

Figure 4:
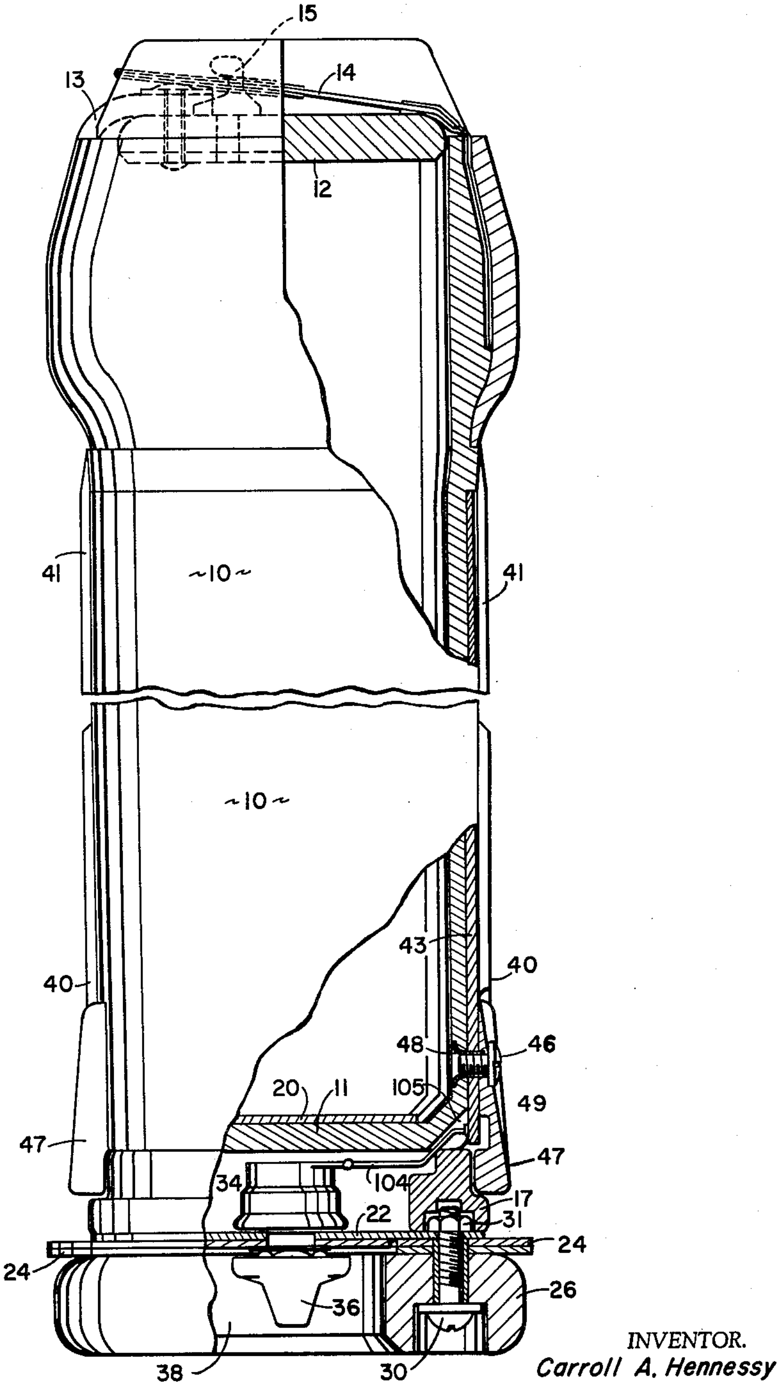
FIGURE 4 is an enlarged view, similar to FIGURE 1, with the casing rotated 90°.

A pair of accelerator washers 24 are positioned on the marginal portion of the plate 22 and extend radially outwardly therefrom. A cap 26 is positioned on the accelerator washers. The cap and washers and the plate 22 are formed with a pair of apertures to receive screws 30 for attaching the washers and cap to the plate 22, as by nuts 31, see FIGURE 4. The bolts 21 also extend through assembly and nuts 32 are threaded on the outer ends of the bolts 21, see FIGURES 1 and 2.

There are two multi-contact switches 34, 35, mounted on the plate 32 and having operating knobs 36 and 37 positioned in a recess 38 formed in the cap 26. The switch 34 is a line switch for the selection of the line or route over which the carrier is to travel, the switch 35 being a station switch for selecting the station to which the carrier will be delivered.

Figure 3:
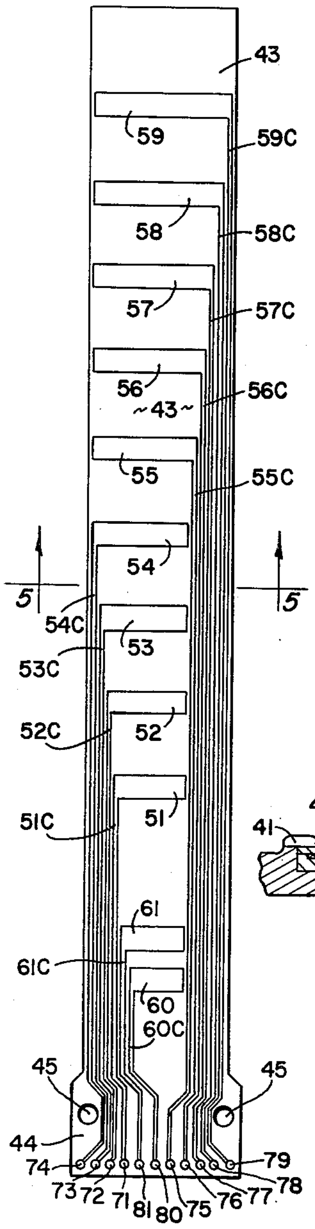
FIGURE 3 is a top plan view of the contact plate with the conductor insulating strips omitted.
Figure 5:
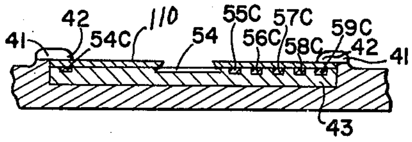
FIGURE 5 is a partial sectional view taken on line 5—5, FIGURE 1.

The casing 10 is formed on its opposite flat sides adjacent to the end carrying the closure 11 with a pair of ribs 40, extending in spaced apart parallel relation. There is a similar pair of ribs 41 adjacent the opposite end of the casing. The ribs 40, 41, are positioned in registration and are formed with inwardly extended flanges 42, see FIGURE 5. A contact plate 43 is positioned between the pairs of ribs 40, 41, by being inserted under the overhanging flanges 42 by sliding the plate lengthwise of the casing. The terminal end 44 of the plate, adjacent the closure 11, is of somewhat greater width and is provided with apertures 45, see FIGURE 3, to receive screws 46 extending through a brush plate 47 overlying the end portion 44 of the plate 43, the screws threading into eyelets 48 mounted in the wall of the casing 10, see FIGURE 4. With this arrangement, endwise movement of the plate 43 relative to the casing is restrained, and the plate is detachably secured to the casing. The medial surface portion 49 of the brush plate 47 is inclined to provide a sloping surface for the tube brushes in moving toward and from the outer surface of the plate 43.

There is affixed to the outer surface of the plate 43 a multiplicity of contacts 51, 59. These contacts are arranged in spaced apart relation in a row extending lengthwise of the plate in the medial portion thereof. There are also a pair of contacts 60, 61, located adjacent the enlarged end portion of the plate.

The plate 43 is of dielectric material and may be moulded, or otherwise formed, from plastic or ceramic material. There is a conductor connected to each of the contacts 51—61. In the form illustrated in FIGURE 3, the contacts 51, 61, are of rectangular form extending transversely of the plate and the conductors from the respective contacts extend lengthwise of the plate to the enlarged terminal end portion thereof, and are arranged in the marginal side portions of the plate. In order to provide proper space for the conductors, the contacts 51—61 vary in dimension in a direction transversely of the plate. For example, the contact 60, nearest to the terminal end of the plate, is of relatively short length, the remaining contacts progressively increasing in length. This arrangement provides for adequate marginal space in which to run the conductors. The contacts and the conductors may embody any suitable structural arrangement, but the contact plate can be most economically produced by the contacts and conductors being in the form or printed circuity. The conductors 51C—61C extend respectively to terminals 71—81 carried by the terminal end portion 44 of the plate 43, and these terminals are respectively connected to the contacts of switches 34, 35, these connections being by way of conductors extending from the terminals 71, 81, to the respective contacts 90—.

Figure 6:
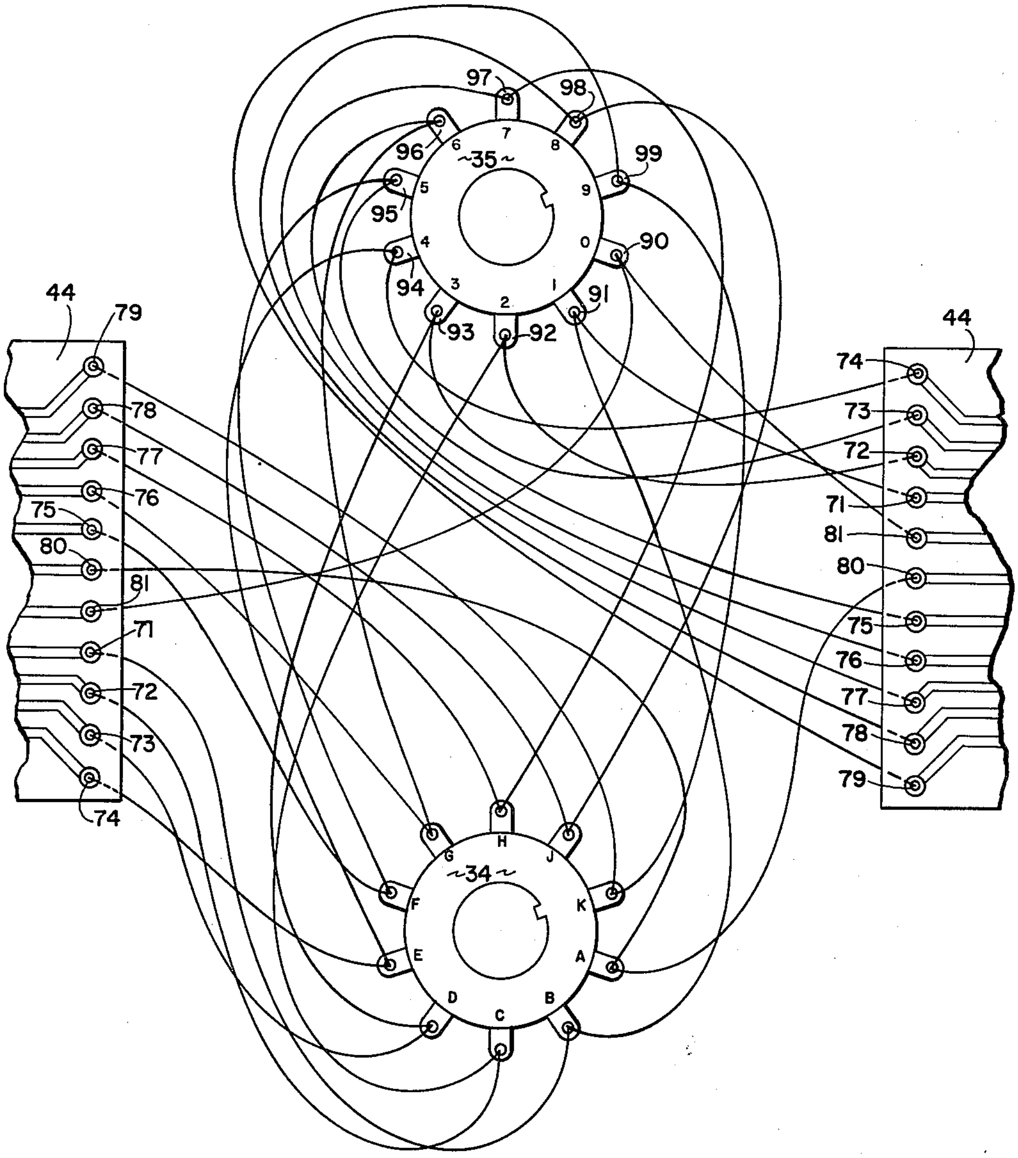
FIGURE 6 is a schematic wiring diagram illustrating the connections between the contact plate terminals and switch contacts.

99 of switch 35, and to contacts designated A, B, C, D, E, F, G, H, J and K of the station selecting switch 34, this connection being shown in the wiring diagram, FIGURE 6. One of the extension conductors between the plate terminals and the switch contacts is illustrated at 104, FIGURE 4. To provide for these extension conductors, the end of the casing 10 is formed with a slot 105 to provide a passage between the terminal end of the plate 43 and the switches 34, 35, mounted in the compartment between the end closure 11 and the plate 22.

With the contacts 51—61 and the conductors 51C—61C being in the form of printed circuity on the plate 43, the conductors are covered by strips 110 of dielectric material secured to the marginal portions of the plate 43, as by adhesive. However the plate, contacts and conductors may be formed other than by printed circuity. For example, the conductors 51C—61C may extend lengthwise of the plate in grooves formed on the under side thereof. In the embodiment of the invention shown, contact plates 43 are affixed to opposite sides of the carrier. This is because of the fact that the carrier shown is obround, or elliptical, in cross section and accordingly may be inserted into the tube with either flat side confronting the tube brushes. Inasmuch as the plates are affixed to both sides of the carrier, brush contact is thus assured.

It will be apparent that the contact plate 43 in the event it should become defective, can be conveniently removed from the carrier and a new plate inserted in its place. It will be understood that the carrier may be provided with one multi-contact switch, or with more than two switches, depending upon the type of installation in which the carrier is to be used.

What I claim is:

1. A carrier for pneumatic tube systems comprising a tubular casing having a closure at one end, a substantially flat contact plate of dielectric material positioned on the outer surface of said casing and extending lengthwise thereof, means for detachably securing said plate to said casing, a series of electrical contacts fixed to and spaced along the outer surface of said plate, a conductor connected to each of said contacts, said conductors extending in a direction lengthwise of said plate, a multi-contact switch mounted in said end closure, and said conductors being connected respectively to the contacts of said switch.

2. A carrier for pneumatic tube systems comprising a tubular casing having a closure at one end, a multi-contact switch mounted in said closure and having an actuator positioned exteriorly thereof, a contact plate of dielectric material positioned on the outer surface of said casing and extending lengthwise thereof, means for detachably securing said plate to said casing, a row of spaced apart electrical contacts permanently fixed to the outer surface of said plate, a conductor connected to each of said contacts, said conductors being carried by said plate and extending lengthwise thereof toward said end closure, said conductors being connected respectively to the contacts of said switch.

3. A carrier for pneumatic tube systems comprising a tubular casing having a closure at one end, a contact plate formed of dielectric material positioned on the outer surface of said casing and extending lengthwise thereof, means for detachably securing said plate to said casing, a row of spaced apart electrical contacts extending lengthwise along the medial portion of said plate, a conductor connected to each of said contacts, said conductors extending lengthwise of the plate in the marginal areas thereof, a multi-contact switch mounted in said end closure, and said conductors being connected respectively to the contacts of said switch.

4. A carrier for pneumatic tube systems comprising a tubular casing having a closure at one end, a multi-contact switch mounted in said end closure, a contact plate formed of dielectric material positioned on the outer surface of said casing and extending lengthwise thereof, means for detachably securing said plate to said casing, said plate having a plurality of electrical contacts spaced apart along the medial portion of said plate, a conductor connected to each of said contacts, said conductors extending from said contacts respectively toward one end of said plate, the free ends of said conductors being connected respectively to the contacts of said switch, said conductors extending from said contacts along the marginal side portions of the plate and being overlaid with insulating material.

5. A carrier for pneumatic tube systems comprising a tubular casing having a closure at one end, a multi-contact switch mounted in said end closure, the outer surface of said casing being formed with ribs extending lengthwise of the casing in parallel spaced relation, a plate of dielectric material slidably interlocking with said ribs, a plurality of spaced apart electrical contacts extending in a row lengthwise of said plate between said ribs, a conductor connected to each of said contacts, said conductors being connected by said plate and extending lengthwise thereof toward said end closure, and being connected respectively to the contacts of said switch.

6. A carrier for pneumatic tube systems as defined in claim 5, including means cooperable with said plate and casing for restraining movement of said plate relative to said ribs.

7. A carrier for pneumatic tube systems comprising a tubular casing having an end closure at one end, a switch mounting plate spaced outwardly from said end closure and being detachably secured thereto, a multi-contact switch mounted between said end closure and plate and being affixed to the latter, a plate of dielectric material positioned on the outer side of the casing and extending lengthwise thereof from said end closure, means for detachably securing said plate to said casing, a plurality of spaced apart electrical contacts permanently affixed to said plate and extending in a row lengthwise thereof, a conductor connected to each of said contacts and extending lengthwise of the plate toward said end closure, each of said conductors being connected to a contact of said switch, said switch having an operating member located externally of said plate.

8. A carrier for pneumatic tube systems comprising a tubular casing having an end closure at one end, a substantially rigid contact plate of dielectric material positioned on the outer surface of said casing and extending lengthwise thereof, means for detachably securing said plate to said casing, a series of electrical contacts fixed to and spaced along the outer surface of said plate, a conductor connected to each of said contacts, said conductors extending in a direction lengthwise of said plate, a multi-contact switch carried by said casing, and said conductors being connected respectively to the contacts of said switch.

9. A carrier for pneumatic tube systems comprising a tubular casing having an end closure at one end, a substantially rigid contact plate of dielectric material positioned on the outer surface of said casing and extending lengthwise thereof, means for detachably securing said plate to said casing, a series of electrical contacts spaced along the outer surface of said plate, a conductor connected to each of said contacts, said conductors extending in a direction lengthwise of said plate, a multi-contact switch carried by said casing, said conductors being connected respectively to the contacts of said switch, and said contacts and said conductors being permanently fixed to said plate.

References Cited in the file of this patent

UNITED STATES PATENTS 2,005,396 Scanlan ---------------- June 18, 1935
2,667,314 Goerlich --------------- Jan. 26, 1954

FOREIGN PATENTS 698,305 France ----------------- Jan. 29, 1931